United States Patent [19]
McGuire

[11] Patent Number: 5,205,207
[45] Date of Patent: Apr. 27, 1993

[54] MULTIMODAL ROTISSERIE

[76] Inventor: Kevin McGuire, 7811 Mission Gorge Rd. Ste. K, San Diego, Calif. 92120

[21] Appl. No.: 914,323

[22] Filed: Jul. 17, 1992

[51] Int. Cl.⁵ ............................................. A47J 37/04
[52] U.S. Cl. ...................................... 99/340; 99/421 H; 99/421 HV; 99/427; 99/446; 99/448; 126/41 B
[58] Field of Search ................... 99/427, 419, 421 R, 99/421 H, 421 HH, 421 HV, 444–446, 448, 450, 340; 126/25 AA, 41 B

[56] References Cited

U.S. PATENT DOCUMENTS

| | | | |
|---|---|---|---|
| 2,122,780 | 7/1938 | Peyton | 99/444 |
| 2,182,225 | 12/1939 | Garvis . | |
| 2,507,243 | 5/1950 | Boyd et al. | 99/421 HV |
| 2,797,633 | 7/1957 | Goodwin | 99/421 HV |
| 2,815,707 | 12/1957 | Morrow | 99/421 HH |
| 3,100,435 | 8/1963 | Mobley, Jr. . | |
| 3,103,161 | 9/1963 | Whitehead . | |
| 3,248,518 | 4/1966 | Ogle, Jr. et al. | 99/446 |
| 3,296,957 | 1/1967 | Gagnon et al. | 99/444 |
| 3,319,562 | 5/1967 | Turcott et al. | 99/421 HV |
| 3,356,012 | 12/1967 | Rosen | 99/421 HV |
| 3,720,157 | 3/1973 | Van Bergen | 99/421 H |
| 3,943,837 | 3/1976 | Trkla | 99/421 H |
| 4,106,473 | 8/1978 | Wandel | 99/446 |
| 4,108,055 | 8/1978 | Simmons . | |
| 4,170,173 | 10/1979 | Bradford . | |
| 4,181,074 | 1/1980 | Hieb | 99/421 HV |
| 4,208,959 | 6/1980 | Schmidt | 99/421 HV |
| 4,421,016 | 12/1983 | Sich | 99/427 |
| 4,627,410 | 12/1986 | Jung . | |

FOREIGN PATENT DOCUMENTS 3044998 8/1982 Fed. Rep. of Germany ... 99/421 H
8103270 11/1981 World Int. Prop. O. ............ 99/419

Primary Examiner—Harvey C. Hornsby
Assistant Examiner—Mark Spisich
Attorney, Agent, or Firm—Ralph S. Branscomb

[57] ABSTRACT

A lower housing defines an elongated heat chamber with side-mounted longitudinally extended linear gas burners which heat the space in the chamber and also edibles mounted on a longitudinal spit which rotates at about the top of the housing. Removable covers enclose the heat chamber, and are removed to permit the spit to be released from its drive mechanism and elevated into a carving mode, with a carving tray underneath, so that meat can be carved on the spit and its accessories, and also on the tray immediately below the spit, keeping all the food warm while it is being carved. The rotisserie includes accessories for mounting fish, poultry and chunk meat, and also has a grill accessory, with the longitudinal dimensioning of all the parts and accessories being such that carving can be done beneath the spit in its carving mode at one portion of the rotisserie, while meat skewered on the other portions of the rotisserie are maintained hot from the heat emanating up from the heat chamber.

15 Claims, 4 Drawing Sheets

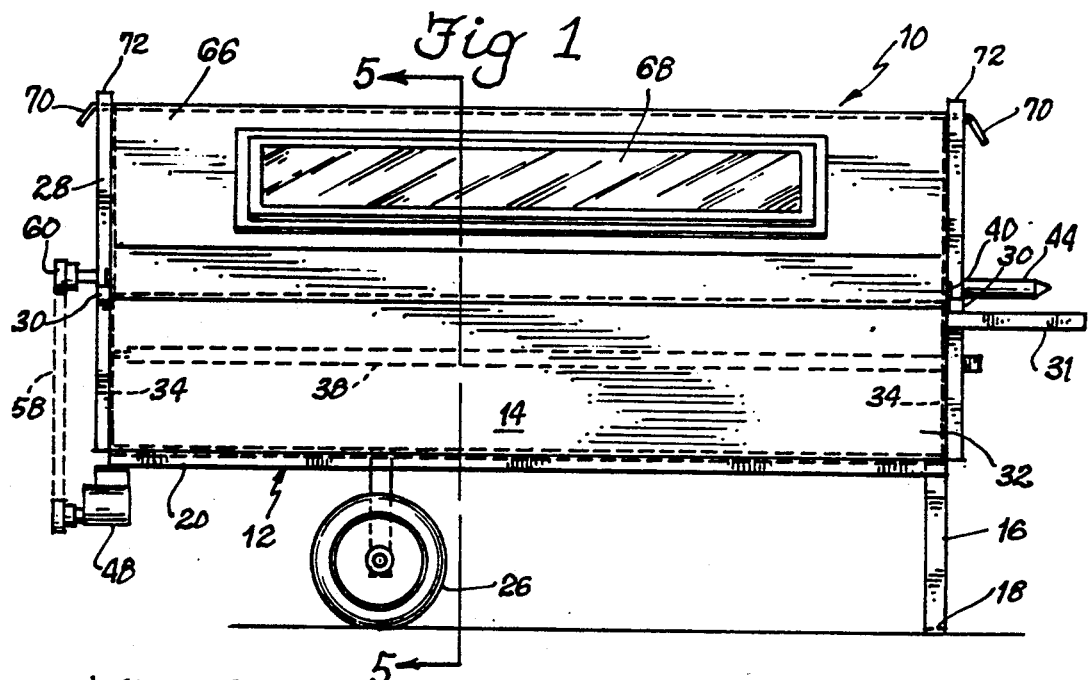
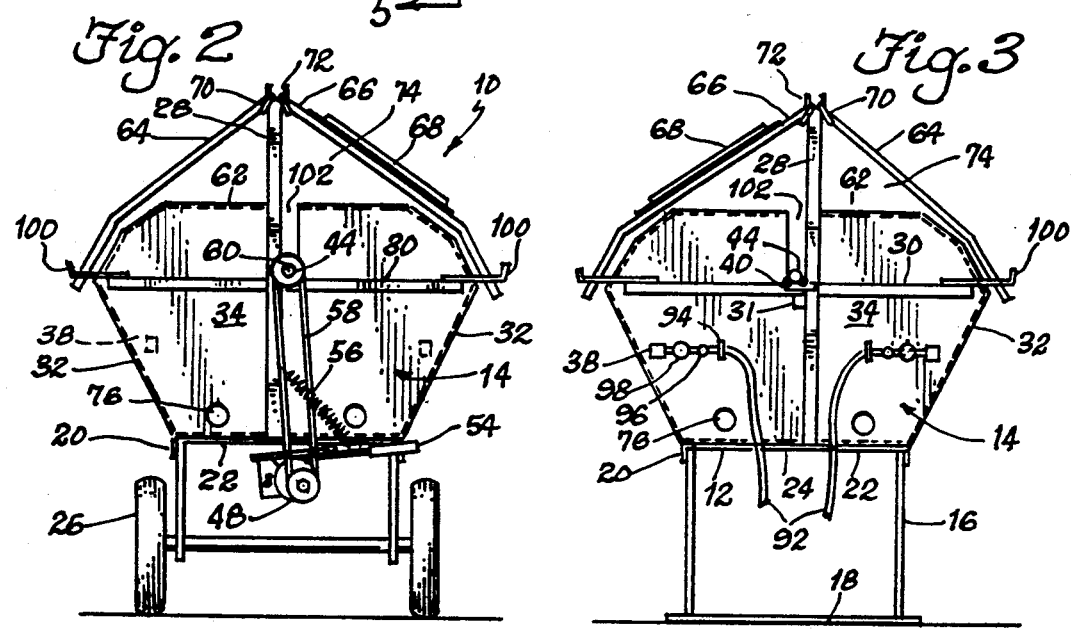
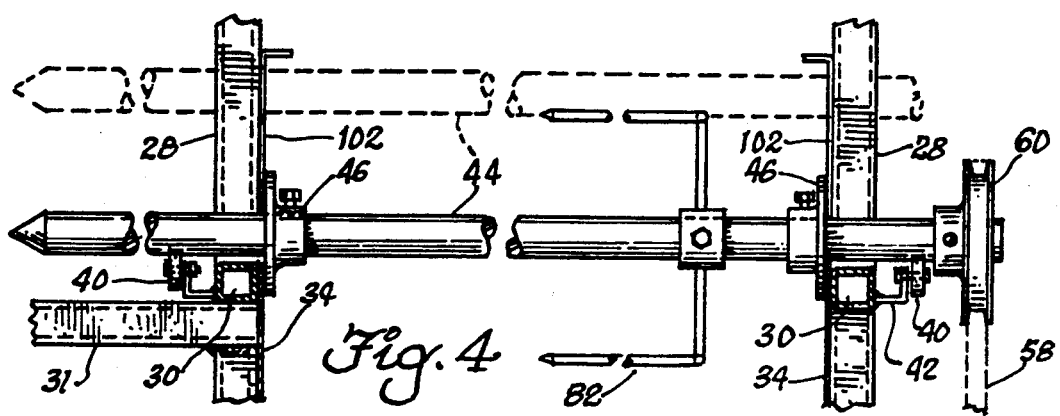

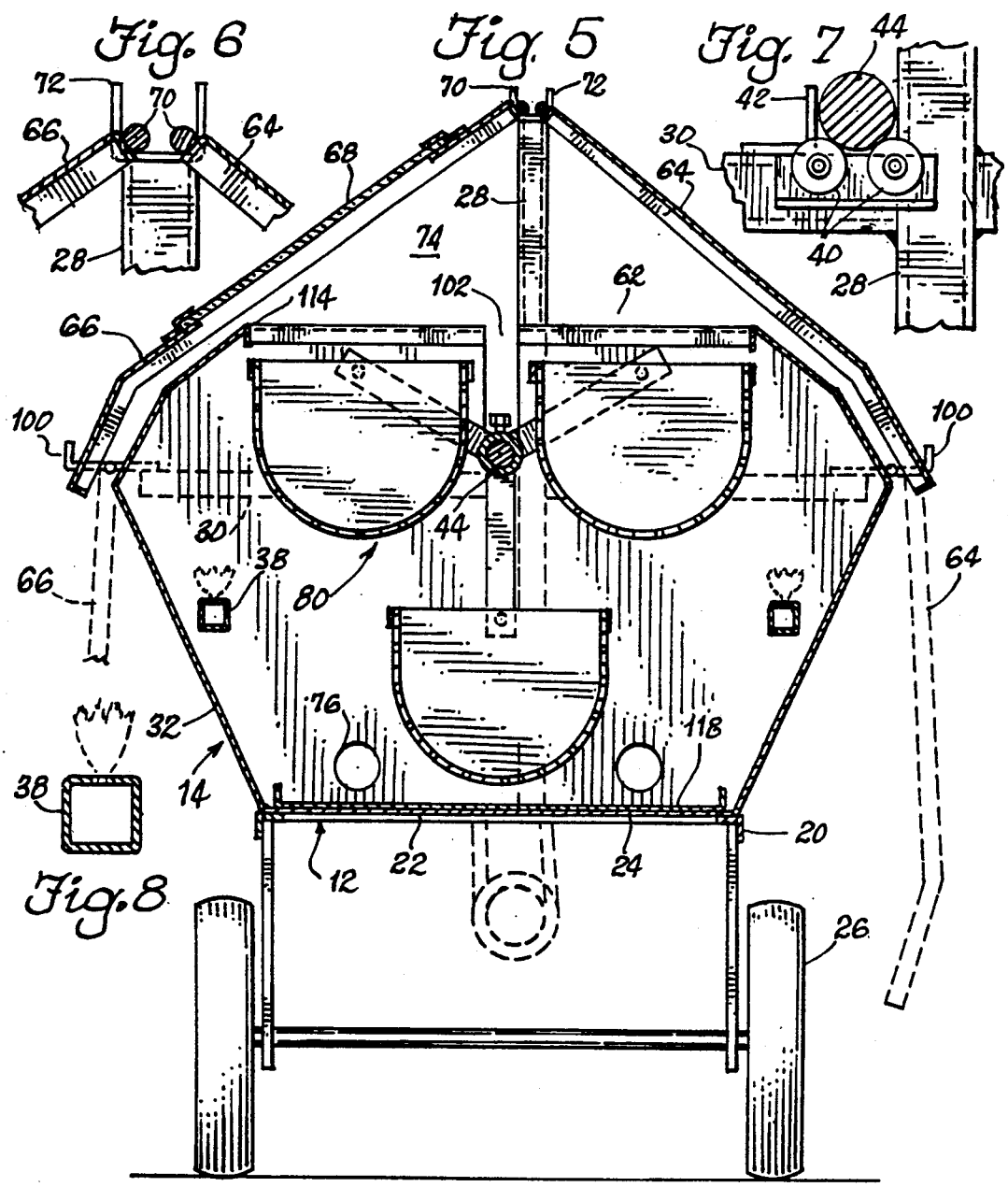

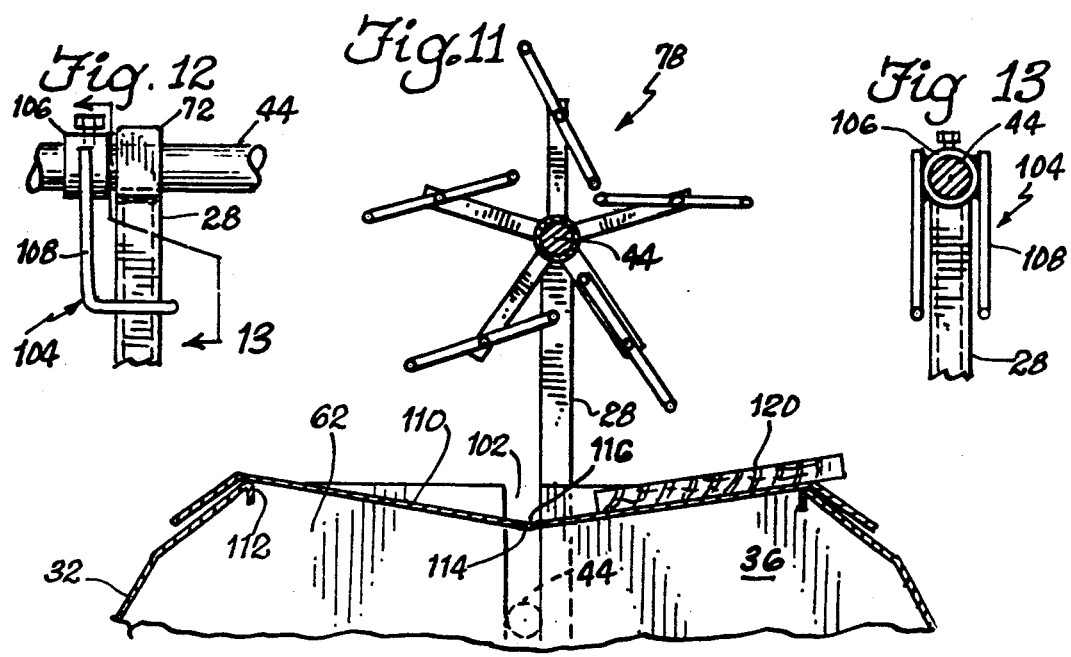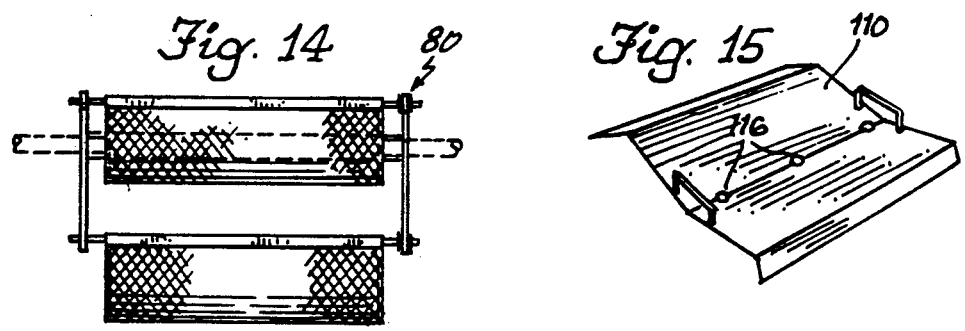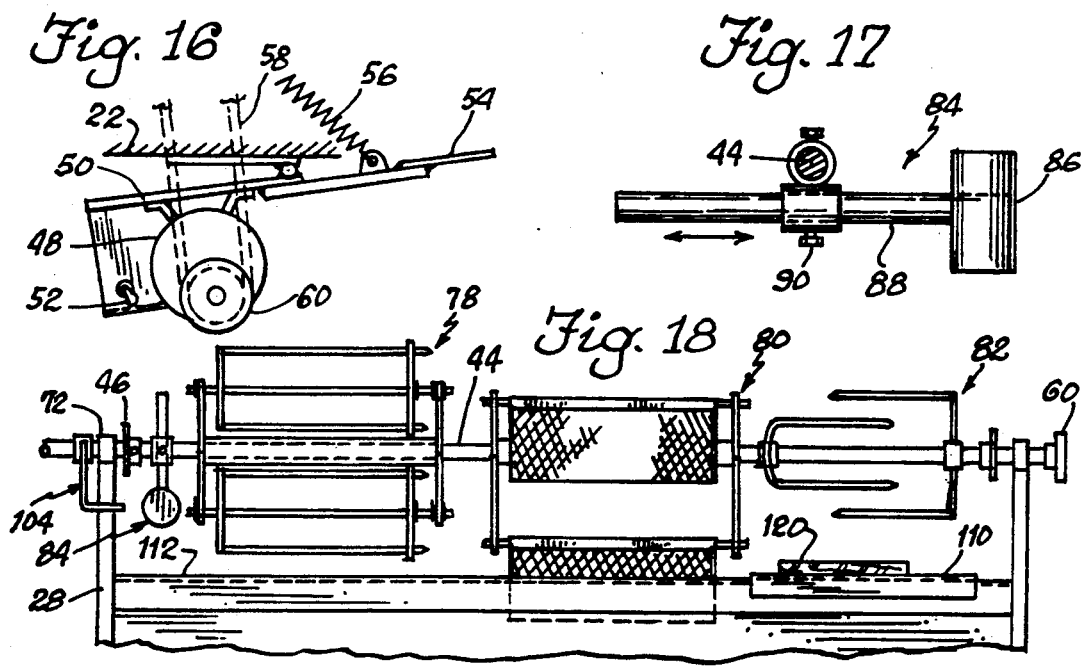

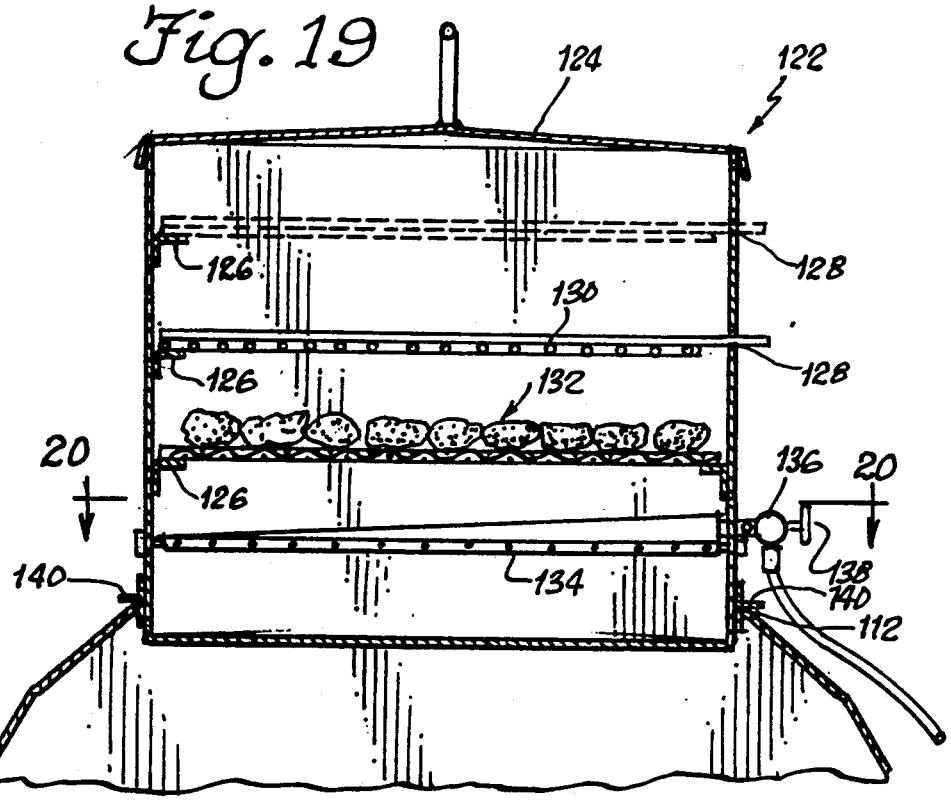
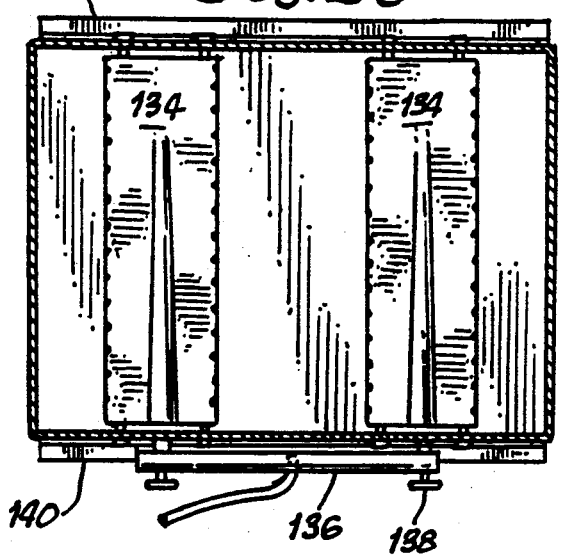
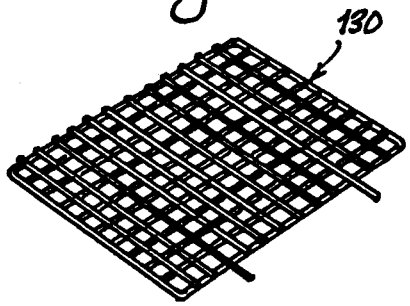
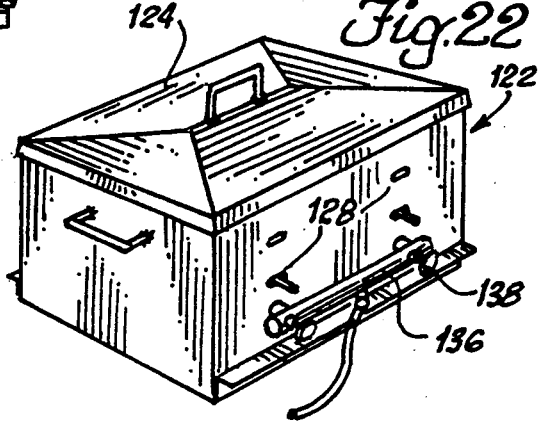

MULTIMODAL ROTISSERIE

BACKGROUND OF THE INVENTION

There are many different rotisserie mechanisms which have been developed and a number of which have been patented as indicated by the prior art disclosure accompanying this application. However, prior art rotisseries tend to be single-purpose mechanisms in most instances. In other words, the rotisseries might be extremely well adapted for cooking an entire animal such as a pig, or cooking chickens or rotating fish baskets, but in general these devices by their design tend to be limited to such single functions.

Additionally, as a general rule the rotisserie structure is not only designed to accommodate a single meat type, but additionally provides no mechanism for carving meat over the heat produced by the rotisserie heat source while other portions of the food remain exposed to the heat, maximizing efficiency and lengthening the duration of time in which the food is maintained in its hot, most edible condition.

Prior art rotisseries, even though designed for a whole animal, lack the capability of optimal performance when cooking for large groups, such as for hundreds of people. This is due in large part to the two reasons mentioned above. First, prior art rotisseries typically lack the capability of preparing several types of food or meat to satisfy the appetites of a variety of people that attend in such large gatherings. Secondly, when preparing food for such large groups, it is quite desirable to have a mechanism for maintaining the food warm throughout the long serving period that is necessary to feed a large number of people.

SUMMARY OF THE INVENTION

The instant invention fulfills the above stated need by providing a very versatile rotisserie unit which has, as two of its basic operational modes, a cooking mode in which the rotisserie rotates to cook food relatively near the gas burners, and an upper carving mode in which the skewer is lifted and supported on two end posts, with a carving tray being placed across the lower housing portion of the unit, resting on the side walls, permitting one portion of the meat at a time to be carved on the underlying carving tray.

In the preferred embodiment, there are two cover panels which converge pyramid-fashion to substantially completely enclose the heat chamber while the food is cooking, with these panels being lowered onto stowage hooks on the sides of the housing when the spit is elevated into the carving mode. The carving tray, different spit-mountable accessories for cooking different types of food, and a specially designed grill unit are all of length dimension about ⅓ of the unobstructed length of the spit so that three of the spit accessories, in addition to carving tray, can be used simultaneously.

BRIEF DESCRIPTION OF THE DRAWINGS

FIG. 1 is a side elevation view of the unit with some internal structure shown in phantom;

FIG. 2 is an end elevation view from the left end of the invention as seen in FIG. 1;

FIG. 3 is an end elevation view from the right end of the unit as seen in FIG. 1;

FIG. 4 is a fragmentary vertical longitudinal cross section of the invention taken on the viewer side of the spit;

FIG. 5 is a section taken along line 5—5 of FIG. 1;

FIG. 6 is a transverse sectional detail illustrating the manner in which the cover panels hook into the upright post ears;

FIG. 7 is a transverse cross sectional detail taken through the spit where it is supported by the transverse-beam-mounted spit bearings;

FIG. 8 is a transverse cross section through one of the linear gas burners shown in FIG. 5 but enlarged;

FIG. 9 is a side elevation view of a spit-mountable poultry rack accessory;

FIG. 10 is an elevation view of a chunk meat rack accessory;

FIG. 11 is a transverse section through the unit in its carving mode;

FIG. 12 is a fragmentary elevational detail of the spit stop;

FIG. 13 is a section taken along line 13—13 of FIG. 12;

FIG. 14 is a side elevation view of yet another accessory comprising rotating hanging trough-shaped baskets;

FIG. 15 is a perspective view of the carving tray;

FIG. 16 is a diagrammatic illustration of the spit drive motor mounting structure;

FIG. 17 is a transverse section through the spit illustrating the mounting of the counterweight accessory on the spit;

FIG. 18 is a diagrammatic side elevation view illustrating the manner in which three spit-mountable accessories fit on the unobstructed spit length for simultaneous use;

FIG. 19 is a transverse cross section through a grill accessory which rests on the side wall support rails of the lower housing in use;

FIG. 20 is a section taken along 20—20 of FIG. 19;

FIG. 21 is a perspective view of a grill element which fits in the unit of FIGS. 19 and 21; and, FIG. 22 is a perspective view of the grill enclosure unit.

DETAILED DESCRIPTION OF THE PREFERRED EMBODIMENT

The body of the unit is indicated at 10, and includes the frame structure 12 and the housing 14. The frame is functional and substantially non-novel. Members of the frame include front support legs 16 with lower stabilizing crossbar 18, the legs being connected to the side flanges 20 of the bottom pan 22, and the extended, flat horizontal part 24 possibly doubling as the floor for the housing 14. The frame also includes strut-mounted wheels 26, a pair of spit support posts 28 and transverse beams 30 which in the illustrated embodiment lie substantially in the same plane as the respective posts 28. The front beam mounts a handle 31 for moving the unit.

The housing is mounted directly atop the pan 22 and may have a separate floor or use the pan 22 as indicated above. The housing also has two laterally spaced side walls 32 which are joined along their end edges to longitudinally spaced endwalls 34. The housing 14 defines an internal heat chamber 36 which is heated by the two linear pipe gas burners 38 mounted to the inside of the respective side walls 32.

The end walls 34 are mounted flush against the inside surfaces of the support posts 2 and the transverse beams 30 in the illustrated embodiment. In addition to their general strengthening purpose, the transverse beams 30 mount the spit bearings 40 and a retainer flange 42. The spit 44 thus rotates freely on its bearings and is longitudinally stabilized by set screw-fixed end stops 46.

The spit is driven by an electric motor 48 seen in FIGS. 1 and 2 and detailed in FIG. 16. The motor is mounted on a pivot arm 50, pivoted about a longitudinal axis to the underside of the frame pan 22. As can be seen in FIG. 16, the left portion of the pivot arm mounts the motor 48 and its switch 52, and at the right end of the pivot arm is a step or foot pedal 54. The motor is downwardly biased under its own weight, which is augmented by the tension spring 56 to maintain adequate tension on the drive belt 58 which rotates the spit through the spit pulley 60.

The heat chamber as defined above has an expansive open top 62 which must be closed while the rotisserie is in its cooking mode for the obvious reason of retaining heat. This is achieved by a cover, which in the disclosed embodiment comprises a pair of cover panels 64 and 66, with the panel 66 mounting a transparent window 68 primarily for the purpose of entertaining the guests at the function which is being catered, and secondarily for the benefit of the chef.

Aside from the window 68, the two cover panels are 15 substantially identical, with each having a hook detent 70 at each end of its upper edge. The upright shaft-supporting posts 28 mount laterally spaced ears 72 which as can be seen from a number of the figures are positioned and dimensioned to allow the two cover panels to be somewhat loosely hooked over the ears when the rotisserie is in its cooking mode illustrated in FIGS. 1 through 6. The bodies of the cover panels lie loosely against the upper portions of the housing sidewalls.

With the cover panels in place, the heat chamber 36 is substantially closed but nonetheless a considerable amount of ventilation space such as the air space in 74 above the housing endwalls. Air intake is enabled by vent holes 76 at the bottoms of the endwalls.

In use in the cooking mode described above, with the cover panels 64 and 66 in place as in FIG. 5, three spit-mountable cooking accessories are shown. These accessories are somewhat standard and are illustrated as being representative of any spit-mountable cooking rack.

The three accessories shown in FIG. 18 include the poultry rack 78 also shown in end view in FIG. 11 in slightly different form. The central accessory in FIG. 18 is a rotating hanging basket array 80 which is used for fish or vegetables in most instances. The third accessory at the right side of FIG. 18 is the chunk meat rack 82, generally used to skewer prime rib and other chunks of red meat from both sides at once to ensure a secure mounting on the spit.

FIG. 18, which actually does not illustrate the cooking mode of the rotisserie but rather the carving mode, conveniently illustrates these three accessories. It also illustrates a counterbalance 84, detailed in FIG. 17, which has a balancing mass 86 mounted on an axially adjustable rod 88, which is securable by set screw 90 to achieve the proper moment arm to offset the inevitable eccentricity in weight distribution of the fully loaded spit.

FIG. 3 illustrates the gas line hardware mounted to the front endwall of the housing. Incoming gas lines 92 are retained by brackets 94, passing through an ignitor 76 and an operating valve 98 on the way to connection with the linear gas burners 38.

The above is a substantially complete description of the operation of the rotisserie in its cooking mode. There follows a description of the unit in its carving mode. The general idea of the carving mode is to elevate the spit onto the tops of the spit support posts 28, where the spit is held in place by means of the spaced ears 72. FIG. 11 illustrates the spit atop the spit support posts. In order to switch the rotisserie into the carving mode, several steps must be taken.

First, the cover panels 64 and 66 must be removed from the covering position shown in FIGS. 1 through 3. They are simply unhooked from the post ears 72, with the panel hooks 70 then engaging the transverse beam hooks 100 so that they hang out of the way, conveniently alongside the housing 14 as shown in FIG. 5 in phantom.

Before or after the cover panels are removed, the spit is removed from its drive equipment by depressing the foot pedal 54, raising the motor 48 to slacken the belt (or chain) 58, so that the belt may be removed from the spit pulley 60 (or sprocket if a chain drive is used).

At this point the spit is free to be moved, and it is raised vertically through the clearance slots 102 provided in the endwalls and placed directly atop the support posts. 28. This generally requires a person at each end of the spit, as the spit is designed to hold several hundred pounds of meat to feed up to five hundred people at once.

Once the spit has been elevated into the carving mode, atop the support posts, it is preferably locked into place by means of the spit rotation stop 104 which is set screw-fixed to the sleeve 106 which mounts the two tines 108 of the stop, with the tines stradling one of the upright posts 28 as shown in FIG. 12 to securely fix the spit against rotation.

At this point, the carving tray 110 is placed over an appropriate portion of the length of the rotisserie, resting on support rails 112 formed into the upper edges of the housing side walls 32. FIG. 11 clearly illustrates the manner in which the tray seats on the rails. The carving tray is V-shaped, With a vertex 114 preferably defines a plurality of grease drain holes 116. Resting on the floor of the housing in the preferred embodiment is a fat drip container or tray 118 best shown in FIG. 5, so that fat dripping through the tray 110 falls into this container, which spans the length of the rotisserie unit.

As can be seen in FIG. 18, in the preferred, illustrated embodiment carving tray 110 is of length dimension of on the order of ⅓ of the unobstructed spit length as shown in FIG. 18. This permits meat to be carved from any one of the accessories shown in FIG. 18 above the carving tray 110, while permitting the rest of the meat or other food to be kept warm above the heat chamber 36. Ordinarily, the burners 38 would be off at this point, but the housing 14 and the other structure inside the heat chamber emanates enough heat to maintain the warmth of meat on skewer accessories in the position shown in the left and center of FIG. 18. Of course, if residual heat is inadequate the burners could be turned on again.

In addition to permitting the meat on the skewers which is not being carved to retain heat, the carving tray also helps to retain heat in the meat as it is being carved, as the tray is metal and immediately above the heat chamber. Although meat could be cut directly on the carving tray, ordinarily a cutting board such as indicated at 120 would be used for the usual reasons.

The unit as it has been described thusfar pertains to a very large rotisserie used for catering events with hundreds of people and accommodating different types of meat and other food. It is intended that at least two other smaller models will be produced. These models will have substantially the same features but on a reduced scale. The longitudinal dimension of the rotisserie in particular will be aborted considerably for the smaller commercial unit and the smallest unit which is a home rotisserie.

All fixtures mounted on the spit can be easily longitudinally displaced or slid off the spit entirely by loosening the set screw bolts which retain the sleeves that are characteristic of all the skewer-mounted fixtures of the invention, all of which are shown in FIG. 18. The accessories are thus removable at will, and of course the carving tray 110 can be shuttled back and forth as needed to lie below the appropriate accessory.

In a variation of the carving mode of the unit, a grill is shown in FIGS. 19 through 22 which incorporates a grill cooking function into the capabilities of the rotisserie unit. The grill unit, which is virtually self-descriptive from a view of FIG. 19, in essence comprises the box-like enclosure 122 with a removable lid 124, and multiple alternative cooking levels established by ledges 126 and holes or slots 128 to accommodate the grill element 130, shown in FIG. 21 at the selected height.

Beneath the grill levels is an optional lava rock layer 132 comprising rocks closely distributed over an open grate. Beneath the heat re-radiating lava rock layer are gas burners 134, appropriately communicating through the manifold 136 and control valves 138 to a source of gas.

The box 122 of the grill has two side flanges 140 which permit the grill to be set onto the support rails 112 of the housing in a manner similar to the way in which the carving tray 110 is supported as shown in FIG. 11.

When in place on the lower housing 14 of the rotisserie unit as shown in FIG. 19, the grill unit is of longitudinal dimension small enough to permit the carving tray 110 to be put beside it. The box 122 may or may not have an open bottom to permit heat from the main burners 38 to warm the contents in the grill as well as maintain heat beneath the carving tray. Either way, the main burners can be used if necessary to warm the carving tray and the meat that is being sliced above it.

The rotisserie unit as thus illustrated, described and claimed in essentially a unit to end all units. It will accomplish every function readily imaginable by a rotisserie or grill, and especially by dint of the proposed dimension reductions to accommodate smaller commercial units and a home model, the rotisserie should be poised to fit a great many niches in the open flame food cooking industry.

It is hereby claimed:

1. A multimodal rotisserie comprising:
   (a) a body having:
      (i) a frame;
      (ii) a housing supported on said frame and having a floor, two spaced sidewalls defining a longitudinal direction parallel thereto, and a pair of spaced endwalls connected to said sidewalls such that said housing defines a heating chamber having an at least partially open top;
   (b) heat producing means in said heating chamber;
   (c) a spit;
   (d) spit support bearing means defined by said body to rotationally mount said spit longitudinally extended above said floor at a cooking level in a cooking mode;
   (e) said body defining carving mode mounts for mounting said spit at a carving level in a carving mode elevated above said cooking level;
   (f) said housing side walls each having an upper edge defining a support rail such that two parallel support rails are defined; and,
   (g) a carving tray configured to seat on said support rails and cover at least a portion of said heating chamber top beneath said carving level to permit the carving of meat on said spit and on said carving tray without removing said spit from said mounts, said carving tray being movable between selected positions on said rails between the endwalls of the housing so that the tray can be selectively positioned directly under the food on the spit.

2. Structure according to claim 1 and including a separate unit releasable carving mode spit stop releasably clampable onto said spit to engage said body in said carving mode to maintain said spit non-rotational while in the carving mode.

3. Structure according to claim 2 wherein said stop comprises a fork having a lockable sleeve extending over said spit 4. Structure according to claim 1 wherein said spit mounts a spit pulley and including a motor mounted on said body and belt drive means releasably engaging said spit pulley in said cooking mode such that said spit can be released from said drive means to be moved into said carving mode.

5. Structure according to claim 1 and including a plurality of cooking accessories mountable on said spit, and said spit defines an unobstructed spit length between said spit support bearing means of lengths sufficient to mount a plurality of said accessories simultaneously and sequentially thereon, and said carving tray is of length dimension to permit at least one of said accessories to be suspended by said spit over said heat chamber unobstructed by said carving tray.

6. Structure according to claim 5 wherein said carving tray is on the order of ⅓ the unobstructed spit length and said accessories are on the order of ⅓ the unobstructed spit length such that two accessories can remain on the unobstructed portion of the heat chamber while said carving tray is in place.

7. Structure according to claim 6 wherein said accessories include a chunk meat rack, a poultry rack, and a hanging basket array.

8. Structure according to claim 1 wherein said spit is removable and including a removable grill unit mountable on said support rails when said spit is removed.

9. Structure according to claim 8 wherein said grill unit and said carving tray are of a combined length no greater than the spacing between said endwalls such that said carving tray and grill unit can be used simultaneously on said housing.

10. Structure according to claim 9 wherein said grill unit includes its own openable substantially closed self-heated grill container.

11. Structure according to claim 10 wherein said grill container has an open bottom to receive heat from said heat chamber.

12. A multimodal rotisserie comprising:
   (a) a body having:

(i) a frame;
(ii) a housing supported on said frame and having a floor, two spaced sidewalls defining a longitudinal direction parallel thereto, and a pair of spaced endwalls connected to said sidewalls such that said housing defines a heating chamber having an at least partially open top;

(b) heat producing means in said heating chamber;
(c) a spit;
(d) spit support bearing means defined by said body to rotationally mount said spit longitudinally extended above said floor at a cooking level in a cooking mode;
(e) said body defining carving mode mounts for mounting said spit at a carving level in a carving mode elevated above said cooking level;
(f) a carving tray configured to seat on and cover at least a portion of said heating chamber top beneath said carving level to permit the carving of meat on said spit and on said carving tray without removing said spit from said mounts;
(g) a motor mounted on said body and drive means releasably engaging said spit in said cooking mode such that said spit can be released from said drive means to be moved into said carving mode; and,
(d) said motor engaging said spit with a belt and being mounted on a pivot arm and defining a foot pedal on the end of said pit arm remote from said motor and having a pivot point between said pedal and said motor such that a rotisserie operator can release said spit from said motor by depressing said foot pedal, thereby raising said motor.

13. A multimodal rotisserie comprising:
(a) a body having:
(i) a frame;
(ii) a housing supported on said frame and having a floor, two spaced sidewalls defining a longitudinal direction parallel thereto, and a pair of spaced endwalls connected to said sidewalls such that said housing defines a heating chamber having an at least partially open top;

(b) heat producing means in said heating chamber;
(c) a spit;
(d) spit support bearing means defined by said body to rotationally mount said spit longitudinally extended above said floor at a cooking level in a cooking mode;
(e) said body defining carving mode mounts for mounting said spit at a carving level in a carving mode elevated above said cooking level;
(f) a carving tray configured to seat on and cover at least a portion of said heating chamber top beneath said carving level to permit the carving of meat on said spit and on said carving tray without removing said spit from said mounts;
(g) a removable cover means seatable over said housing to substantially enclose said heat chamber around said spit while in said cooking mode and being removable for use of said rotisserie in said carving mode;
(h) said cover means comprising a pair of converging panels and panel mounting means mounting said cover panels to substantially span the areas between the apparatus of said housing side walls, with said cover panels substantially meeting at a longitudinal juncture defining an apex;
(i) said panel mounting means comprising detentes defined by said body to engage the upper edges of said cover panels while said cover panels rest against the upper portions of said sidewalls;
(j) said frame defining a pair of longitudinally spaced upright posts mounting said detentes; and,
(k) said detentes comprising an upper set of cooking mode ears extending from upper portions of said posts, and said cover panels have hooks to engage said ears, and said body defining a lower set of carving mode ears for engaging said detentes of said cover panels to suspend same downwardly while in the carving mode.

14. Structure according to claim 13 wherein said frame includes a pair of transverse beams defined across the longitudinal ends of said body, and said transverse beams mount said carving mode ears on the opposite ends thereof, and also mount said spit bearing means.

15. A multimodal rotisserie comprising:
(a) a body having:
(i) a frame;
(ii) a housing supported on said frame and having a floor, two spaced sidewalls defining a longitudinal direction parallel thereto, and a pair of spaced endwalls connected to said sidewalls such that said housing defines a heating chamber having an at least partially open top;

(b) heat producing means in said heating chamber;
(c) a spit;
(d) spit support bearing means defined by said body to rotationally mount said spit longitudinally extended above said floor at a cooking level in a cooking mode;
(e) said body defining carving mode mounts for mounting said spit at a carving level in a carving mode elevated above said cooking level;
(f) a carving tray configured to seat on and cover at least a portion of said heating chamber top beneath said carving level to permit the carving of meat on said spit and on said carving tray without removing said spit from said mounts; and,
(g) a grease collecting container resting on said floor, and said carving tray being slightly V-shaped and upwardly concave in transverse cross section, having at least one drain aperture at the apex thereof to drain juices through said carving tray into said grease collecting container.

* * * * *